H. D. BALL & J. I. FLOYD.
SPEEDOMETER.
APPLICATION FILED MAR. 21, 1914.

1,126,683.

Patented Feb. 2, 1915.

3 SHEETS—SHEET 1.

H. D. BALL & J. I. FLOYD.
SPEEDOMETER.
APPLICATION FILED MAR. 21, 1914.

1,126,683.

Patented Feb. 2, 1915.
3 SHEETS—SHEET 2.

Witnesses:
W. L. Dow
John F. McCarney Jr.

Inventors:
Horace D. Ball
John I. Floyd
By Pond & Wilson
Attys

H. D. BALL & J. I. FLOYD.
SPEEDOMETER.
APPLICATION FILED MAR. 21, 1914.

1,126,683.

Patented Feb. 2, 1915.
3 SHEETS—SHEET 3.

Witnesses:
W. L. Dow.
John F. McCanna Jr.

Inventors
Horace D. Ball
John I. Floyd
By Pond & Wilson
Attys.

UNITED STATES PATENT OFFICE.

HORACE D. BALL AND JOHN I. FLOYD, OF BELOIT, WISCONSIN, ASSIGNORS OF ONE-FOURTH TO HIRAM R. GRAY AND ONE-FOURTH TO JAMES F. MURRAY, OF BELOIT, WISCONSIN.

SPEEDOMETER.

1,126,683.  Specification of Letters Patent.  Patented Feb. 2, 1915.

Application filed March 21, 1914.  Serial No. 826,335.

*To all whom it may concern:*

Be it known that we, HORACE D. BALL and JOHN I. FLOYD, citizens of the United States, residing at Beloit, in the county of Rock and State of Wisconsin, have invented certain new and useful Improvements in Speedometers, of which the following is a specification.

This invention relates to speedometers for indicating the speed of a rotating member.

An object of our invention is to provide a simple and accurate mechanism for indicating the speed of a rotating member by a rotary speed-indicating dial operated by a centrifugal governor.

It is a further object to provide a novel means for transferring the action of a centrifugal governor to a speed-indicating member so that the governor movement which is variable proportionally with speed increment will be transferred to the indicating member in a movement directly proportional to the speed increment.

A further object of our invention is to provide a speedometer which will indicate speed of a rotating member driven in either direction, without change or adjustment of any parts of the mechanism.

A further object of our invention lies in a novel casing structure and form of speed-indicating dial, whereby the design of the casing coöperates with the speedometer mechanism in effecting a compact and efficiently manufactured device, and the improved form of dial permits its indications to be readily readable from various locations thereabout.

Figure 1:
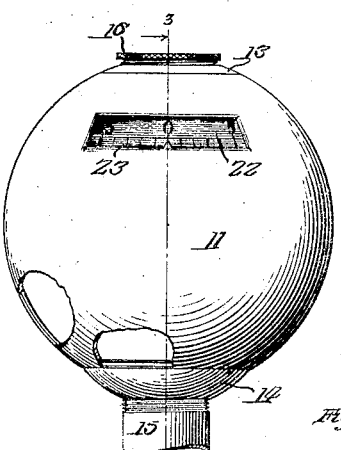
Figure 2:
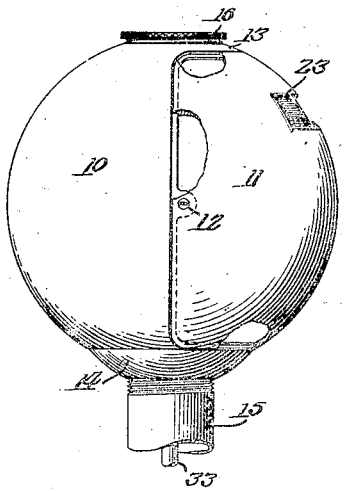
Figure 3:
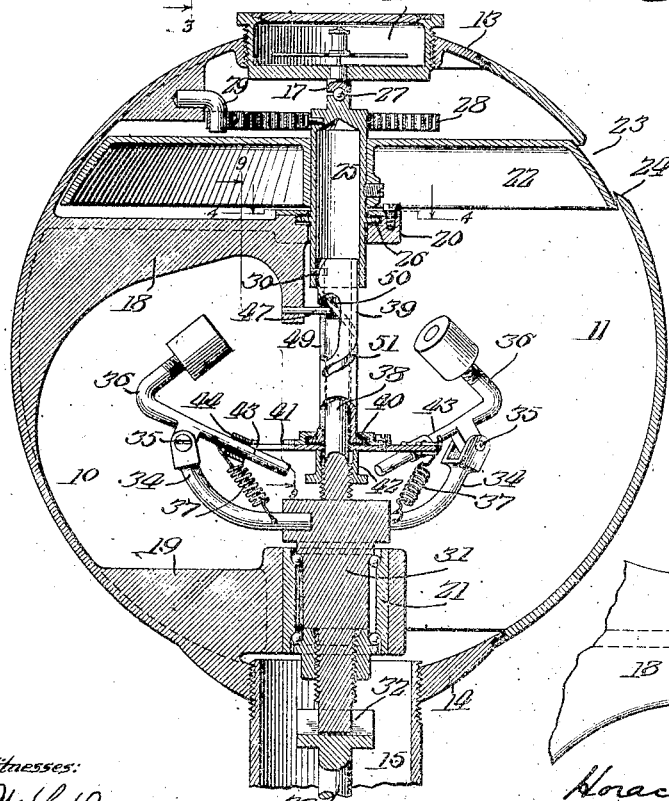
Figure 4:
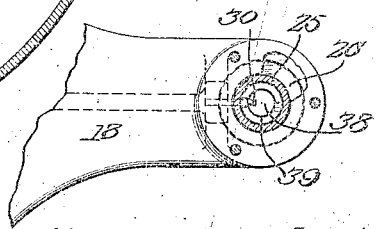
Figure 6:
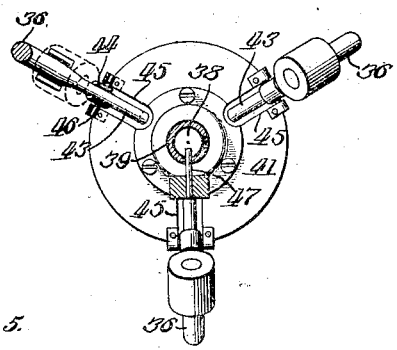
Figure 5:
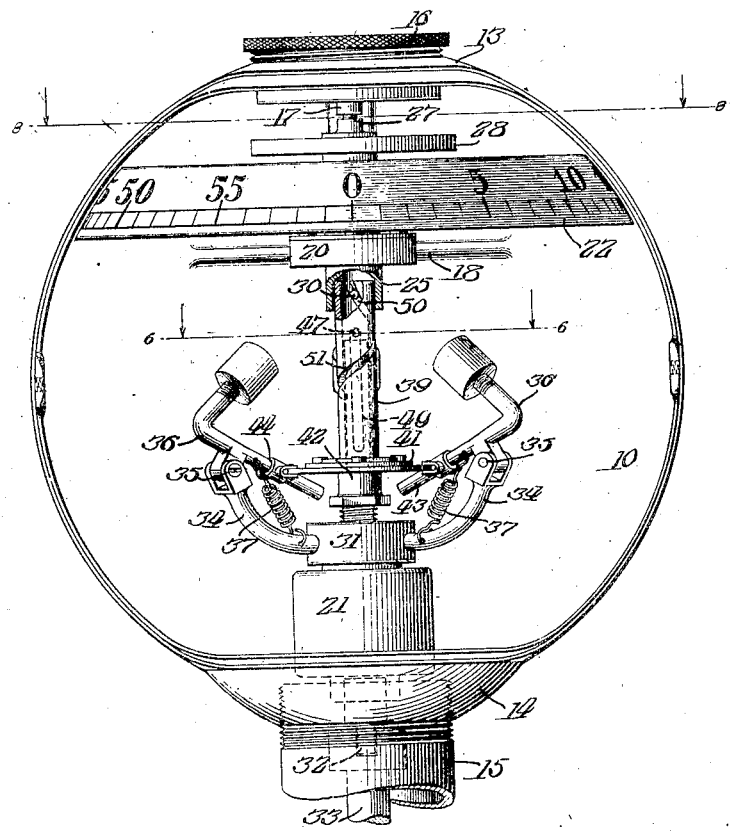
Figure 7:
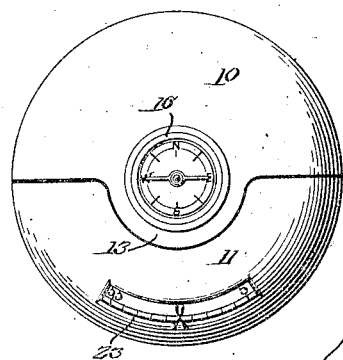
Figure 8:
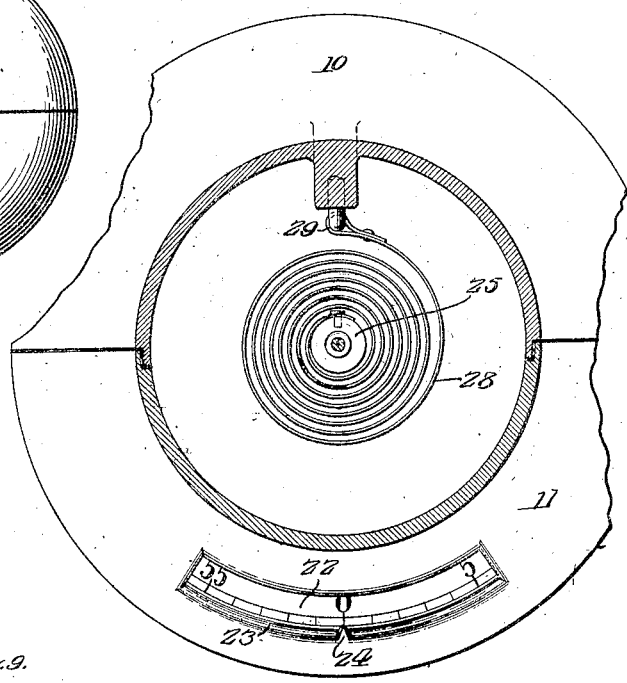
Figure 9:
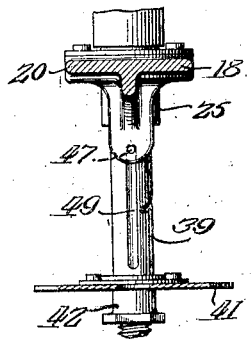

In the accompanying drawings: Figure 1 is a face view of our improved speedometer, portions of the casing being broken away. Fig. 2 is a side view of Fig. 1 with portions of the casing broken away. Fig. 3 is an enlarged vertical sectional view through the speedometer as taken on the line 3—3 of Fig. 1, the movable parts being in normal position. Fig. 4 is a detail plan sectional view taken on the line 4—4 of Fig. 3. Fig. 5 is a view in elevation looking at the face of the speedometer and with the face-section of the casing removed. Fig. 6 is a plan sectional view taken on the line 6—6 of Fig. 5. Fig. 7 is a plan view of Fig. 1. Fig. 8 is a plan sectional view taken on the line 8—8 of Fig. 5. Fig. 9 is a vertical sectional detail view taken on the line 9—9 of Fig. 3.

A predominant feature of the design of our improved speedometer is that its casing is spherical; and further, that the mechanism of the speedometer is peculiarly associated with this design; and this design effects an improved indication reading as will be more particularly pointed out hereinafter. The casing is formed in two sections, a frame-casing 10 and a face-casing 11 fitted together with grooved edges and held united by screws 12, the frame-casing having diametrically opposite extensions 13 and 14, the former being a bearing-receiving means and the latter a support-receiving means. The pipe-section 15 is screwed into the extension 14 and serves as a support for the speedometer as well as a drive-casing.

Screwed into the extension 13 of the casing is a compass-casing 16 containing a compass; speedometers being used most generally in motor vehicles this compass feature is very desirable; and besides this placing of the compass its casing serves as one member of an end thrust bearing by having a ball-seat portion 17.

The rotary speed-indicating dial and centrifugal governor are coaxially mounted and supported through means of arms 18 and 19 formed from frame-casing 10, said arms carrying coaxially located bearings 20 and 21 for the dial and governor respectively, the latter bearing being a ball-bearing.

The indicating-dial 22 is located in the upper portion of the spherical casing, has a frusto-conically shaped indicating-face conforming to this portion of the casing, and has upon its indicating face graduations uniformly spaced thereabout, representing (when the speedometer is used in connection with motor vehicles) a progressing mileage indication. The face-casing 11 is formed with a sight-opening 23 disclosing a portion of the dial reading, said casing having a stationary pointer 24 opposite which the 0-indication of the dial is located normally. The dial is mounted fixed upon a tubular shaft-member 25 closed at its upper end, the shaft-member being rotatably mounted in the bearing 20 and held from axial movement by the annular flange 26, has at its upper end a ball thrust bearing 27 with the compass-casing portion 17, and a helical spring 28 fastened at 29 to the frame 10 and at its oppoite end to the shaft-member 25 serves to maintain the dial in its abovementioned normal position. The shaft-member 25 has an internally extending pin 30 which is operated by the governor to rotate the dial in speed-indicating movement as followingly described.

The centrifugal governor occupies a central location in the spherical casing whereby its centrifugally operated arms move in orbits at the diametrical portion of the casing. The governor rotor 31 is journaled in the ball-bearing 21 and has a suitable connection 32 with the driving member 33 whose speed of rotation is sought to be indicated by the dial. The rotor carries fixedly three radially and upwardly extending posts 34 each of which has pivoted thereto on a horizontal axis at 35, a weighted arm 36. Said arms are pivoted intermediate their ends and their weighted ends located above their pivots and such as to effect a desired maximum orbit for the movement of said arms by centrifugal force. Coiled springs 37 serve as a means for maintaining the weighted arms in a normal position. The rotor carries an upstanding shaft 38, and mounted rotatably and movable axially thereon is a sleeve 39 whose upper end is received and fits slidably in the tubular shaft-member 25 and whose lower end has an annular flange 40 which engages with an annular groove in the transverse disk 41, whereby the disk is movable rotatably on the annular flange 40 and shaft 38 but is fixed with respect to the sleeve 39 from movement axially; and an axially adjustable stop 42 on shaft 38 limits the down position of said disk. The inner ends 43 of the weighted arms 36 are connected to the said disk in such a manner that by the pivoting of said arms their oscillatory movement will move the disk reciprocably upon shaft 38 and likewise move the sleeve 39. This connection can be made in various manners, that herein shown being by the arm ends 43 fitting slidably in the apertured heads 44 located in recesses 45 in the disk periphery, the heads being trunnioned upon the disk, so that by oscillatory movement of said arms the disk is moved reciprocably. The sleeve 39 is held from rotary movement by a pin 47 carried by an extension 49 from the arm 18 being located in a longitudinally extending slot 49 in said sleeve. The action of the governor imparts rotary movement to the dial through a means which transfers the governor movement which is variable proportionally with acceleration of speed, to the dial in a movement directly proportional to said speed acceleration. A means we have found satisfactory to this end is in the provision of a spiral groove in the sleeve 39, the pin 30 of shaft-member 25 being located in said groove to be guided thereby, the pitch of the groove being variable to effect the abovementioned change of movement; and the variable pitch is clearly illustrated in Fig. 3 wherein it will be seen that the groove spiral incline commences at 50 with a slight angle which increases as the groove nears its lower end, until at 51 it has a relatively steep incline.

Speedometers of the above-described type are most generally used in connection with motor vehicles for indicating the miles per hour at which the vehicle is traveling, and in such case the driving member 33 would be suitably connected to one of the vehicle wheels. Following the operation of the speedometer thus applied, it will be seen that: With the vehicle at a stand the movable parts of the speedometer mechanism are as shown in the drawings. As the vehicle is put in motion the governor is rotated, increment of speed moving the weighted arms outward by centrifugal force, this movement causing the sleeve 39 to be raised and thereby imparting rotary movement to the dial through the spiral groove and pin connection, such rotation of the dial indicating at the sight 23 the speed at which the vehicle is traveling, and such rotation being against the tension of springs 28 and 37 which assist in moving the parts to their normal position with the decline in speed of the vehicle. The fact will be observed from governor action that the weighted arms will move a greater distance proportionally in their orbit during the low speed than when in their higher speed and would therefore if connected to impart this movement directly to the dial cause said dial to indicate discriminately, in that during the slow speed of the governor the dial would move at a fast rate, while during the faster speed of the governor the dial would move at a relatively slower rate. This defect is remedied through means as above described in the form of the variable pit , groove 50—51; and through this means the governor movement which varies with speed increment is transferred to the speed-indicating member so that the speed-indicating movement thereof is directly proportional to the speed increment. By adjustment of the member 42 axially a means is provided for setting the dial with its 0 indication normally at the pointer.

It will be noticed that the rotor governor may be rotated in either direction and will cause indication of speed when so rotated;

and by this action two objects are effected: The speed indication of a member can be obtained for reverse directions of drive without any change of speedometer mechanism; and where speedometers are used with motor vehicles the driving connection of the speedometer can lead to either a right or left wheel, whereas heretofore with speedometers in general use it has been necessary to drive from a certain side because of the inability of the speedometer to operate in opposite directions of drive without change of mechanism. These objects are accomplished by the peculiar construction and relationship of the governor and dial in which there is a swivel connection at 40 between the two to effect the said objects. This positive connection permits of thoroughly accurate speed-indication, thereby remedying a defect common to different types of speedometers now in use, especially those of the magnetic type where changes in atmospheric conditions effect changes in their operation so as to make them inaccurate under all conditions of use.

A further feature of our invention will be observed in the spherical casing construction and the relation of the different operating elements, also in the frusto-conically shaped speed-indicating dial. The peculiar coöperation of the compass-casing and end-bearing has been abovementioned; and with the conforming of the dial to the spherical casing in the upper portion thereof and the locating of the governor in the central portion thereof whereby the orbit of the arms will be disposed in the diametrical portion of the sphere, a very compact and well associated structure is permitted and in a minimum sized casing. By the conical indicating face of the dial and the axis thereof being vertical, the locating of the speedometer in a motor vehicle at the dash as is the common practice, the said face is at approximately right angles to the line of vision of occupants from various positions in the vehicle, thereby permitting ready and accurate reading.

We claim as our invention:

1. In a speedometer, a rotary speed-indicating dial, a centrifugal governor on an axis co-axial with that of the dial, means including a variable pitch cam movable axially of said axis by centrifugal operation of the governor, and a connection between said axially movable cam-means and the dial for moving the dial rotatably by axial movement of said cam-means.

2. In a speedometer, a rotary speed-indicating dial, a centrifugal governor, a reciprocable member having a variable pitch cam-way thereon, connection between the centrifugal governor and said reciprocable member for reciprocating the latter through operation of the former, and a connection between the speed-indication dial and the said variable pitch cam-way whereby the said dial is moved rotatably by said spiral cam-way.

3. In a speedometer, a rotary speed-indicating dial, a centrifugal governor, a reciprocable member having a spiral cam-way thereon formed with a variable pitch, connection between the centrifugal governor and said reciprocable member for reciprocating the latter through operation of the former, and a connection between the speed-indicating dial and the said spiral cam-way whereby the said dial is moved rotatably by said spiral cam-way.

4. In a speedometer, a rotary speed-indicating dial, a governor, telescoping cylindrical members, one movable rotatably in connection with the dial and the other movable axially by governor movement, one of said members being provided with a spiral guide-way of variable pitch, and means connecting said guide-way with the other member whereby a predetermined rotary movement is imparted to the speed-indicating dial through said governor operation.

5. In a speedometer, the combination with a rotary speed-indicating dial, of a centrifugal governor comprising, a rotor, a plurality of weighted arms pivoted intermediate their ends to the rotor and having their non-weighted ends extending toward the rotor axis, means co-axial with the rotor axis and being movable axially, a connection between said non-weighted arms and said means for moving said means axially by centrifugal operation of said weighted arms, and a connection between said axially movable means and said dial including a spiral guideway, whereby rotary speed-indicating movement is transferred to the dial through governor operation.

6. In a speedometer, a shaft having a hollow center portion, a rotary speed-indicating dial mounted upon the shaft, a centrifugal governor, a cylindrical member movable axially in said hollow shaft portion, a connection between said cylindrical member and the governor for moving the former axially through governor operation, and a connection between the said hollow shaft and cylindrical member including a spiral cam-way whereby rotary motion may be imparted to the shaft by axial movement of the governor operated member.

7. In a speedometer, a rotary dial having speed-indicating graduations thereon, means exerting a tension upon the dial to move it yieldingly in one direction of rotation, an adjustable stop for limiting its movement in said direction, and means for moving the dial in the opposite direction in speed-indicating movement.

8. In a speedometer, a rotary speed-indicating dial, a centrifugal governor, means movable axially of the dial axis and being connected with the governor for transferring governor movement to the dial to rotate same in speed-indicating movement, an adjustable stop for limiting the movement of said means in one direction, and spring means for maintaining said axially movable means yieldingly limited by said stop.

In testimony whereof we have hereunto set our hands in the presence of two subscribing witnesses.

HORACE D. BALL.
JOHN I. FLOYD.

In presence of—
J. W. Day,
F. R. O'Neal.